(No Model.) 2 Sheets—Sheet 2.
E. P. SPAHN.
THILL COUPLING.
No. 540,030. Patented May 28, 1895.
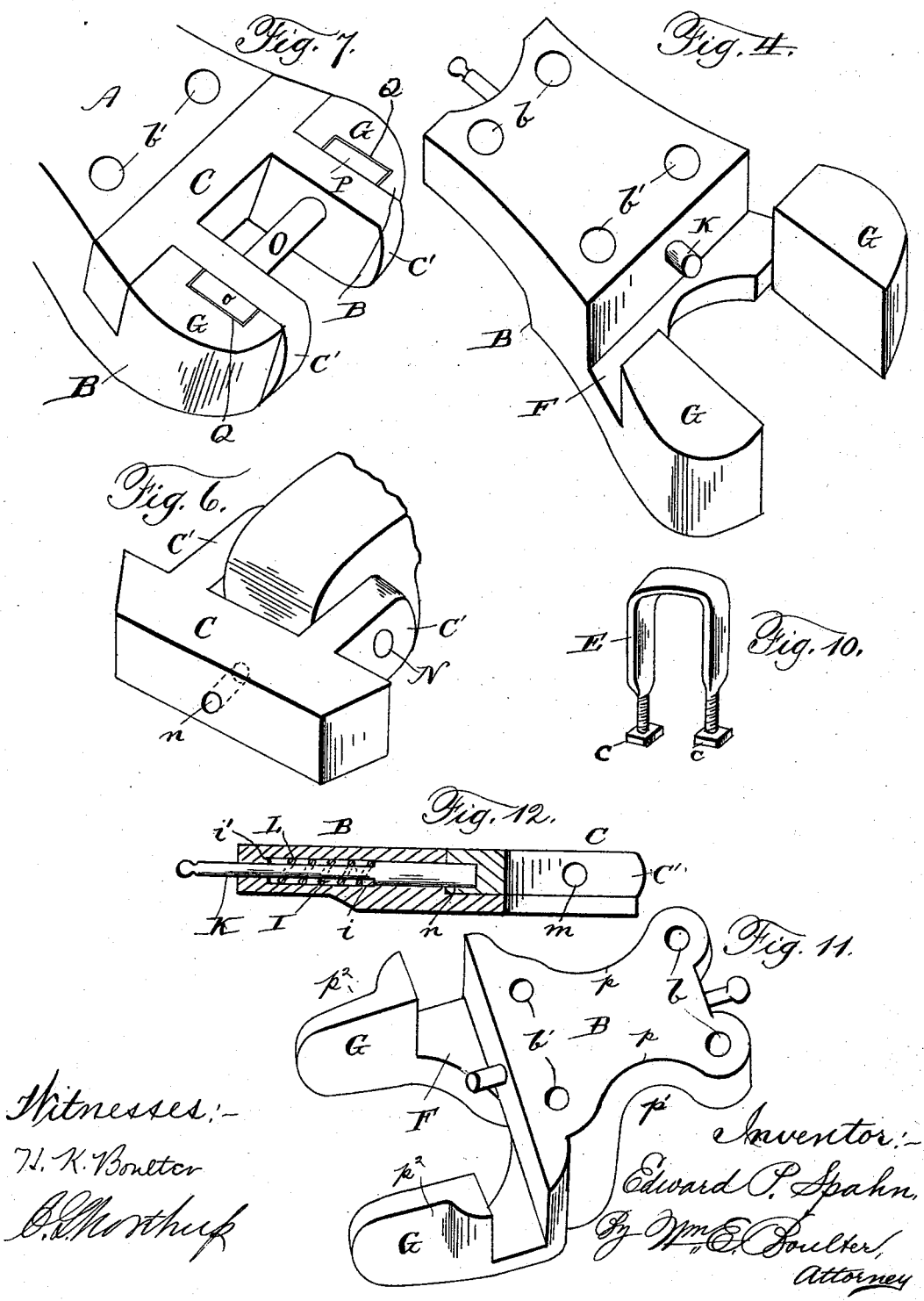

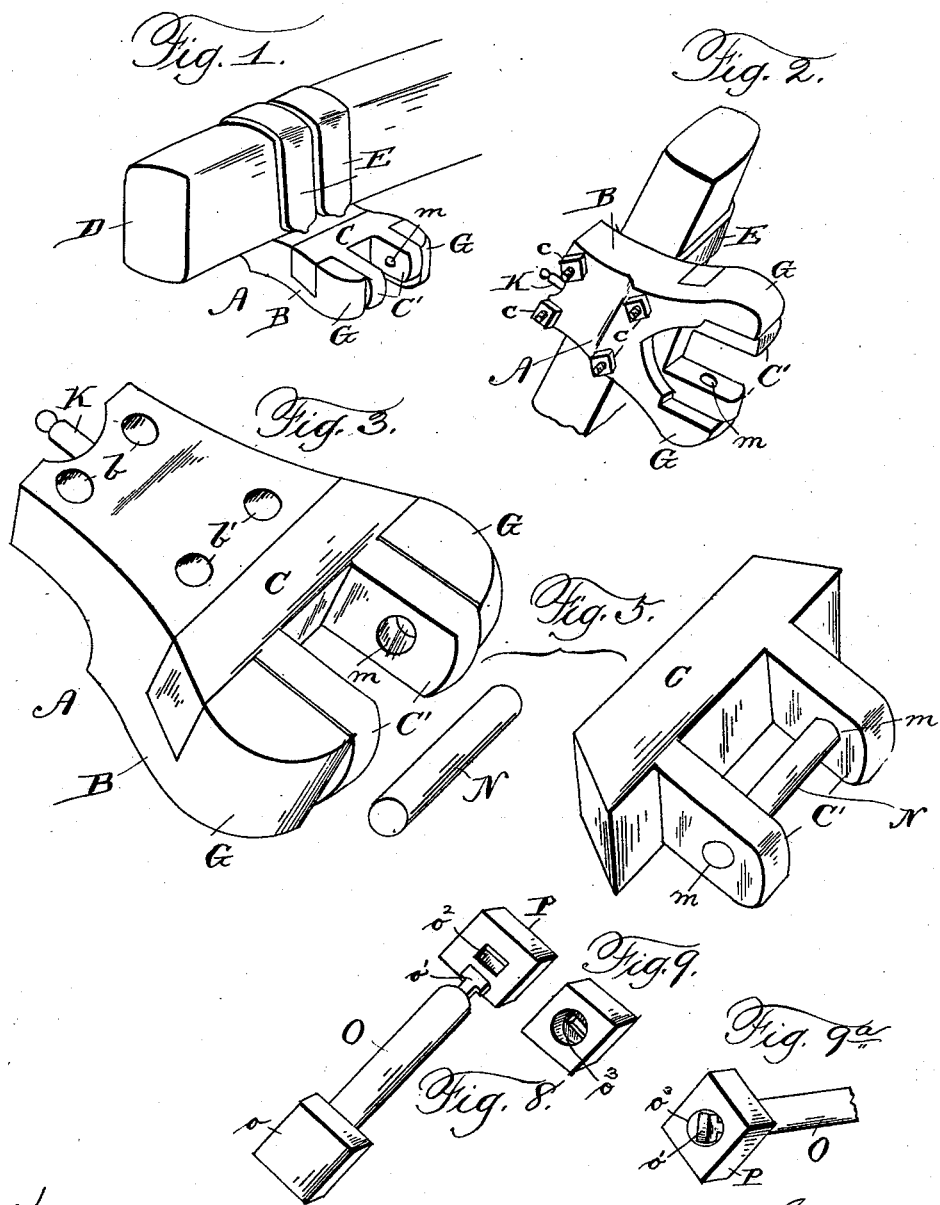

UNITED STATES PATENT OFFICE.

EDWARD P. SPAHN, OF DUBUQUE, IOWA.

THILL-COUPLING.

SPECIFICATION forming part of Letters Patent No. 540,030, dated May 28, 1895.

Application filed September 29, 1894. Serial No. 524,438. (No model.)

*To all whom it may concern:*

Be it known that I, EDWARD P. SPAHN, a citizen of the United States, residing at Dubuque, in the county of Dubuque and State of Iowa, have invented certain new and useful Improvements in Shaft-Attaching Devices for Vehicles; and I do declare the following to be a full, clear, and exact description of the invention, such as will enable others skilled in the art to which it appertains to make and use the same.

My invention has relation to vehicles, and it relates more particularly to means whereby shafts or poles may be attached to vehicles according to whether one or two horses are required, the change being effected in a very convenient and quick manner, and among the objects in view is to provide a simple, inexpensive, durable and readily operated device whereby either a pair of shafts or a pole may be attached securely to and readily detached from a vehicle, and with the above and other objects in view, all of which will be made apparent hereinafter, the invention consists in the novel construction, arrangement and combination of parts as hereinafter fully described, illustrated in the drawings and pointed out in the appended claims.

In the accompanying drawings, Figure 1 is a perspective view of one end of an axle, showing one of my attaching devices in position thereon ready to have a pair of shafts or a pole attached thereto. Fig. 2 is an under side perspective view of the same. Fig. 3 is an enlarged view of the device detached. Fig. 4 is a perspective view of one section of the device; Fig. 5, a like view of the other section and the pin to connect the shafts or pole thereto. Fig. 6 is a perspective view showing the manner of attaching the section seen in Fig. 5 to the shafts. Fig. 7 is a perspective view of the device, showing a slight modification in the same. Fig. 8 is a detail perspective view of the securing or retaining bolt and detachable nut for the shafts. Fig. 9 is a like view, reversed, of the said nut. Fig. 9ᵃ is a perspective view showing the end of the bolt locked in the nut. Fig. 10 is a detail perspective view of one of the clips for securing the device to an axle. Fig. 11 is a detail perspective view showing a slight modification in the construction of the device. Fig. 12 is a vertical section of the device, illustrating the arrangement of the locking bolt or pin for one of the sections of the device.

It will be understood that in practice there will be two of the hereinafter described attaching or coupling devices carried by the axle—one for each arm of a pair of shafts or end of the usual cross-bar supporting a pole, and therefore it will not be necessary either to illustrate or describe more than one of the said attaching devices in order to give a clear understanding of the invention.

Referring to the drawings and more particularly to Figs. 1 to 6 inclusive, A indicates my improved attaching or coupling device, the same comprising essentially a section adapted to be attached to an axle of a vehicle, and another section adapted to be attached to a pair of shafts or a pole which latter section is adapted to be coupled or attached to the other section on the axle whereby the shafts or pole will be firmly secured in position. I construct the two sections so that they may be detachably connected together and to the axle and shafts or pole respectively, so that the shafts or pole may be readily detached for interchangeable connection with the vehicle all as will be presently fully set forth.

B indicates one of the sections of the attaching device which section is adapted to be attached to an axle D and for which purpose it is provided with two pairs of vertical openings $b$ $b'$ through which pass the threaded ends of clips E which embrace the axle and carry nuts $c$, upon their lower ends. By this means the section B may be readily detached from the axle when desired.

The section B is somewhat widened toward its forward end and is provided with a transverse recess or socket F and with lateral ears or lugs G, said section B being cut away or recessed between the ears or lugs. The section is provided with a longitudinal opening or perforation I within which is arranged and adapted to have a longitudinal movement, a bolt or pin K, said bolt or pin being normally projected forwardly by any suitable means. For instance said bolt or pin may have a shoulder $i$, against which bears one end of a coiled spring L encircling said bolt and bearing at its opposite end against a shoulder $i'$ on the section B. The bolt is made of sufficient length to enable its rear end to constantly project beyond the rear face of section B to enable the bolt to be withdrawn sufficiently to release the other section of the coupling device.

C indicates the other section of the device which is adapted to have attached thereto the shafts or cross bar of a pole. Said section is made somewhat of a T-shape, the body portion or head of which is adapted to fit snugly within the socket or recess F and being provided with forwardly-projecting lugs or ears C' between which is adapted to fit the rear ends of the shafts or the cross bar of a pole, as seen in Fig. 6, for which purpose said ears are horizontally perforated as at $m$, through which and a perforation in the shafts or crossbar the pin N is adapted to pass.

The distance between the lugs G of section B is such as to adapt the latter to fit up closely against the ears or lugs C' when section C is in position, said lugs G projecting forwardly and terminating flush or nearly so with the outer edge of the lugs C'.

In order that section C may be securely held in position within the section B I provide said section C with a horizontal socket $n$, into which is adapted to fit the projecting forward end of the pin K. When it is desired to remove section C from section B the pin may be readily retracted to release it from the socket $n$.

The outer ends of the section C are made of a shape to cause said ends to lie flush with and merge into the curvature of the sides of the section B.

In Figs. 7, 8, 9 and 9ª I show a slight modification wherein I employ a headed bolt O for connecting the shafts to the section C, the said bolt being provided at one end with a head $o$, and at its opposite end with a T-coupling $o'$, which is adapted to be passed through an elongated slot $o^2$ in a nut P, and after being inserted therein turned at right angles within the annular socket $o^3$, to lock the bolt within said nut. The lugs or ears of section B in this construction are recessed upon their inner sides as at Q into which recesses the head of the bolt and the nut P are adapted to snugly fit as seen in said Fig. 7.

In order to lighten the device without impairing its strength or durability I may cut away the section B upon each side as seen at $p$, and upon its under side as at $p'$, in Fig. 11 and also cut away the lugs or ears of section B as seen at $p^2$ in said figure.

By the use of my device it will be readily seen that a change from shafts to a pole or vice versa may be readily accomplished by simply removing the section C and attaching thereto the shafts or cross bar of a pole as the case may be. If desired the shafts and cross bar of a pole may each be fitted with a section C so that the change may be more quickly accomplished.

What I claim, and desire to secure by Letters Patent, is—

1. The herein described coupling device for use as described consisting in the combination with a section adapted to be secured to an axle of a vehicle and provided with a transverse recess and with lateral ears or lugs, of a section provided with a body portion or head adapted to fit within the said recess and lugs or ears adapted to fit between the lugs or ears of the first section and provided with aligned perforations, a pin adapted to enter said perforations, a socket or recess in the said body portion or head, a perforation in the first section and adapted to align with the said socket or recess, and a spring actuated locking bolt adapted to enter said aligned perforation and socket, as and for the purpose specified.

2. The herein described coupling device for use as described comprising a section adapted to be secured to an axle of a vehicle, and having a transverse recess and lateral ears or lugs, and a second section having a body portion or head adapted to lie within the said recess and having ears or lugs provided with aligned perforations, and sockets or recesses on the inner faces of the lugs of the first section, in combination with a pin or bolt adapted to enter said aligned perforations, a head on said bolt adapted to lie within one of the said sockets, a T-head on the opposite end of the bolt and a nut provided with a slot and annular recess adapted to be engaged by said T-head as described, said nut being adapted to fit within the other socket of the first section, as and for the purpose specified.

3. The herein described coupling device for use as described comprising a section adapted to be secured to an axle of a vehicle and provided with a transverse recess and lateral bearing ears, a section provided with a body portion or head adapted to fit within the said recess of the first section and lugs or ears adapted to fit between the lugs or ears of the first section and provided with aligned perforations and a pin adapted to enter said perforations, the said body portion of the second section having a socket or recess and the first section having a perforation adapted to align with said socket or recess, and a spring-actuated locking bolt entering said aligned perforation and socket, an axle, clips embracing the latter and having threaded arms passing through the vertical perforations of the first section and carrying tightening nuts on their lower ends, and a shaft or pole provided with a horizontal perforation and adapted to fit between the lugs of the second section, all as and for the purpose specified.

In testimony whereof I affix my signature in presence of two witnesses.

EDWARD P. SPAHN.

Witnesses:
 OTTO WIEDEMANN,
 ALEX. SIMPLOT.